Patented Sept. 20, 1932

1,877,906

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

META-HYDROXY-DIARYLAMINE-CARBOXYLIC ACID

No Drawing. Application filed June 27, 1930, Serial No. 464,330, and in Germany July 2, 1929.

The present invention relates to new meta-hydroxy-diarylamine-carboxylic acids.

These acids are obtained by heating with carbon dioxide at a superatmospheric pressure an alkali metal salt of a hydroxy-diarylamine corresponding to the general formula:

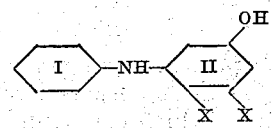

wherein one X means hydrogen, the other X methyl and the benzene nucleus signified by I may contain further substituents.

In this manner carboxylic acids are obtained which correspond probably to the general formula:

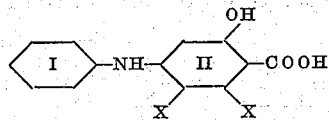

wherein X and the nucleus I have the aforesaid signification.

The position of the carboxylic acid group of these 1-arylamino-3-hydroxy-benzene-carboxylic acids is not exactly known. But as the new acids yield with ferric chloride violet to bluish colorations, it is assumed that the carboxylic acid group enters in an ortho position to the hydroxyl group and probably into a para position to the NH-group.

The new acids which are object of the present invention differ from the products of U. S. application Serial No. 407,274, filed November 14, 1929, by the methyl group present in the hydroxylated nucleus (signified by II in the above formulae). Like the products of the said application they are distinguished by a notable stability especially when compared with the carboxylic acids of U. S. Patent Serial No. 427,564.

As suitable starting material may be named 3-hydroxy-5-methyl-diphenylamine (described in Journal für praktische Chemie, vol. 33, page 539), 3-hydroxy-6-methyl-diphenylamine or such derivatives of these compounds which contain in the non-hydroxylated nucleus (signified above by I) further substituents as methyl- or alkoxy-groups or halogen atoms or simultaneously several thereof.

These compounds used as starting material for the present process may be prepared in the following manner:

3.5-dihydroxy-1-methyl-benzene is condensed with an amine according to the methods usual in preparing m-hydroxy-diphenyl-amines from resorcinol and aromatic amines. Or o-amino-p-cresol is condensed with an aromatic amine (see U. S. application Serial No. 461,046, filed June 13, 1930, now Patent No. 1,822,974).

In order to further illustrate our invention the following examples are given, the parts being by weight and all temperatures in centigrade degrees, but we wish it to be understood that we are not limited to the particular products or reaction conditions mentioned therein:—

Example 1

1990 parts of 3-hydroxy-5-methyl-diphenylamine are dissolved with 560 parts of caustic potash and 3000 parts of water in an autoclave provided with a stirrer; then the water is distilled off in vacuo to complete dryness of the formed potassium salt. After cooling of the reaction mass carbon dioxide is introduced up to a pressure of 10 atmospheres and the whole is heated for about 12 hours to 170°. The cooled melt is worked up by dissolving it in hot water, filtering the solution and precipitating the formed carboxylic acid by means of dilute hydrochloric acid. The raw carboxylic acid may be purified by dissolving it in a dilute solution of sodium carbonate with the addition of some animal charcoal, filtering and again precipitating it by the addition of hydrochloric acid. When recrystallized from glacial acetic acid it represents a yellow powder melting at 195°. It corresponds probably to the following formula:

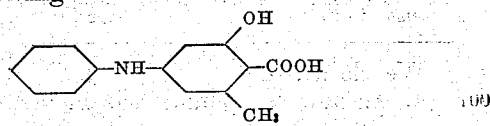

The sodium salt of the acid crystallizes from a concentrated sodium carbonate solution in leaflets having a mother-of-pearl like luster. Its alcoholic solution yields when mixed with some drops of a ferric chloride solution a blue coloration.

When starting from the sodium salt of the 3-hydroxy-5-methyl-diphenylamine the reaction may be carried out in the same manner.

Example 2

277.5 parts of 3-hydroxy-5-methyl-4'-chloro-diphenylamine are dissolved with 66 parts of caustic potash and 1000 parts of water in an autoclave provided with a stirrer; then the water is distilled off in vacuo to complete dryness of the formed potassium salt. After cooling of the reaction mass carbon dioxide is introduced up to a pressure of 10 atmospheres and the whole is heated for about 12 hours to 170°. The cooled melt is worked up by dissolving it in hot water, filtering the solution and precipitating the formed carboxylic acid by means of hydrochloric acid. The raw carboxylic acid may be purified by dissolving it in a solution of sodium carbonate or acetate. It corresponds probably to the following formula:

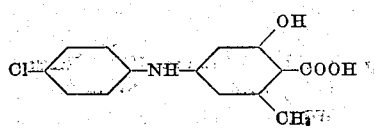

When recrystallized from ortho-dichlorobenzene it melts at 158°. Its alcoholic solution yields when mixed with some drops of a ferric chloride solution a bluish-green coloration.

In an analogous manner the carboxylic acid group may be introduced into the 3-hydroxy-6-methyl-diphenylamine, as well as into the homologues and substitution products of 3-hydroxy-5- or 6-methyl-diphenylamine, which may contain further substituents in the nucleus not containing the hydroxyl group (signified by II in the above formulae).

The following table shows the properties of some analogous carboxylic acids obtainable by the present process:—

| Acid obtained | Crystallized from | Melting point | Coloration with ferric chloride |
|---|---|---|---|
| | | Degrees | |
| 3-hydroxy-6-methyl-diphenylamine carboxylic acid. | Glacial acetic acid. | 179 | Violet |
| 3-hydroxy-6-methyl-4'-chloro-diphenylamine carboxylic acid. | Nitrobenzene. | 200 | Violet |
| 3-hydroxy-6,4'-dimethyl-diphenylamine carboxylic acid. | o-dichlorobenzene. | 204 | Violet |

We claim:—

1. As new compounds the meta-hydroxy-diarylamine carboxylic acids of the probable general formula:

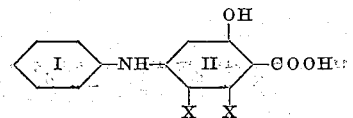

wherein one X means hydrogen, the other X methyl and the benzene nucleus signified by I may contain alkyl or halogen, which compounds are when dry crystallized substances, having a definite melting point, soluble in alkalies, yielding a violet to bluish coloration by mixing their alcoholic solution with ferric chloride.

2. As new compounds the meta-hydroxy-diarylamine carboxylic acids of the probable general formula:

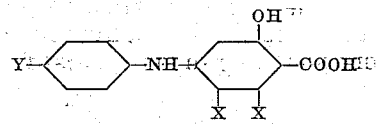

wherein Y represents halogen or an alkyl group and one X represents hydrogen, the other X methyl, which compounds are when dry crystallized substances, having a definite melting point, soluble in alkalies, yielding a violet to bluish coloration by mixing their alcoholic solution with ferric chloride.

3. As a new compound a 3-hydroxy-5-methyl-4'-chloro-diphenylamine carboxylic acid corresponding probably to the formula:

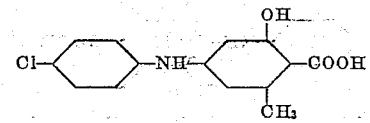

which compound is when dry a crystallized substance melting at 158°, soluble in alkalies, yielding a bluish-green coloration by mixing its alcoholic solution with ferric chloride.

4. As a new compound, a 3-hydroxy-5-methyl-diphenylamine carboxylic acid corresponding probably to the formula:

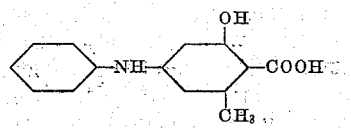

which compound is when dry a crystallized substance melting at 195°, soluble in alkalies, yielding a blue coloration by mixing its alcoholic solution with ferric chloride.

5. As a new compound, a 3-hydroxy-6-methyl-diphenylamine carboxylic acid corresponding probably to the formula:

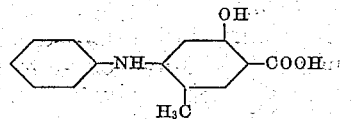

which compound is when dry a crystallized substance melting at 179°, soluble in alkalies, yielding a violet coloration by mixing its alcoholic solution with ferric chloride.

In testimony whereof, we affix our signatures.

LEOPOLD LASKA.
OSKAR HALLER.